United States Patent [19]
Carr

[11] 3,736,738
[45] June 5, 1973

[54] ROW CROP HARVESTER
[75] Inventor: James P. Carr, East Lansing, Mich.
[73] Assignee: FMC Corporation, San Jose, Calif.
[22] Filed: Mar. 18, 1971
[21] Appl. No.: 125,675

[52] U.S. Cl..................................56/330, 56/130
[51] Int. Cl. ...............................A01g 19/00
[58] Field of Search.......................56/330, 1, 328 R, 56/365, 366, 377, 28, 30, 33, 34, 35, 130, 12.8; 198/209, 137, 198, 200, 176, 177, 129, 131

[56] References Cited

UNITED STATES PATENTS

| | | | |
|---|---|---|---|
| 3,225,894 | 12/1965 | Weygandt et al.....................198/140 |
| 3,338,036 | 8/1967 | Hurlburt.................................56/14.4 |
| 3,596,457 | 8/1971 | Van Tine et al........................56/330 |
| 3,184,908 | 5/1965 | Rust........................................56/330 |
| 3,128,589 | 4/1964 | Van Der Lely et al..................56/377 |
| 1,555,692 | 9/1925 | Morton..............................198/137 X |
| 3,462,929 | 8/1969 | Ingalls.................................56/328 R |
| 3,460,332 | 8/1969 | Buchele et al..........................56/330 |
| 3,552,108 | 1/1971 | Kattan et al............................56/330 |
| 2,641,888 | 6/1953 | Grether..................................56/13.5 |
| 2,675,663 | 4/1954 | Ward.......................................56/130 |

FOREIGN PATENTS OR APPLICATIONS
243,308 2/1970 U.S.S.R......................................56/330

Primary Examiner—Russell R. Kinsey
Attorney—F. W. Anderson, C. E. Tripp and A. J. Moore

[57] ABSTRACT

A mobile harvester includes a pair of endless stripper conveyors disposed on opposite sides of the longitudinal centerline of a ridge containing two rows of strawberries or the like. Each conveyor having a lower run moving rearwardly and outwardly relative to the harvester. A plurality of longitudinally extending rows of stripping fingers are individually supported on each conveyor by parallelogram linkages which allow the fingers to float when contacting the ground. The shanks of the fingers are maintained substantially vertical throughout their movement and the conveyors are each driven at a speed relative to the forward speed of the harvester which causes the fingers while in their lower runs to move rearwardly at substantially the same speed as the forward movement of the harvester causing the fingers to move transversely through the associated row of plants outwardly through the shortest possible distance thereby dislodging the berries from the plants and moving them outwardly into collecting means with a minimum of damage to the berries.

11 Claims, 8 Drawing Figures

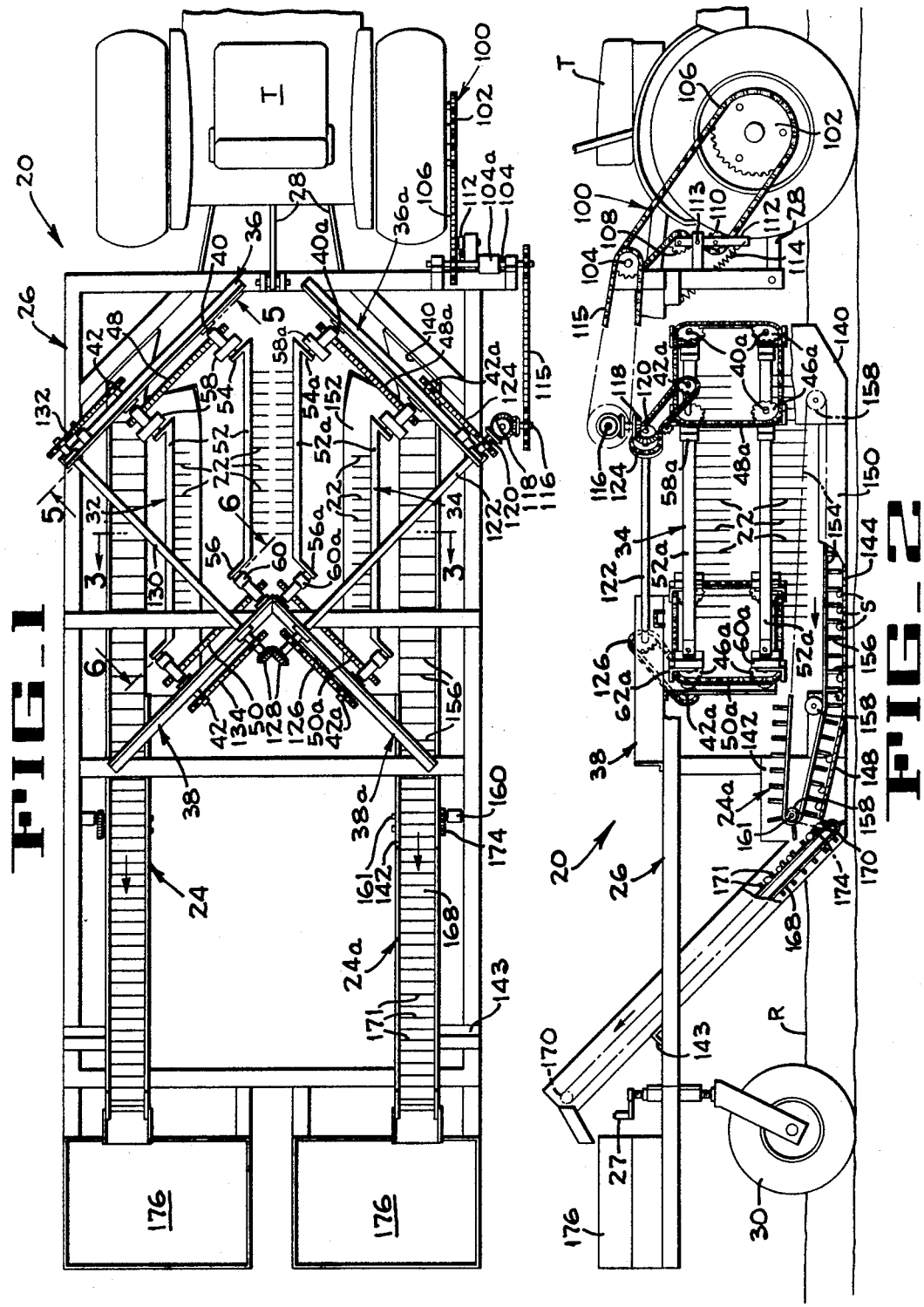

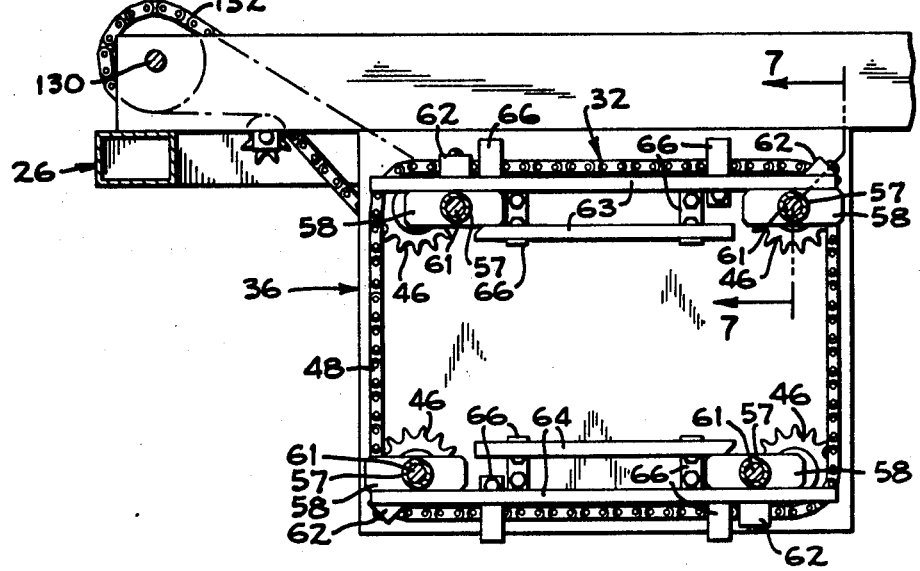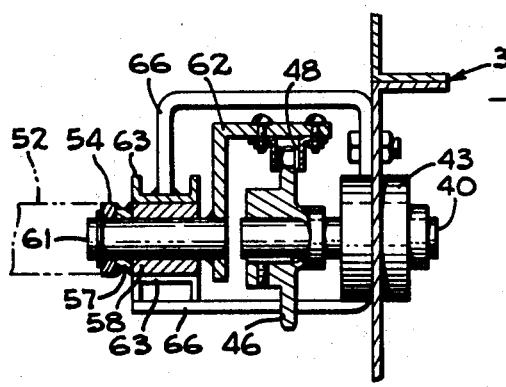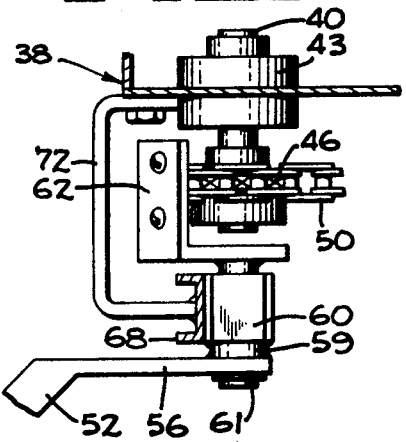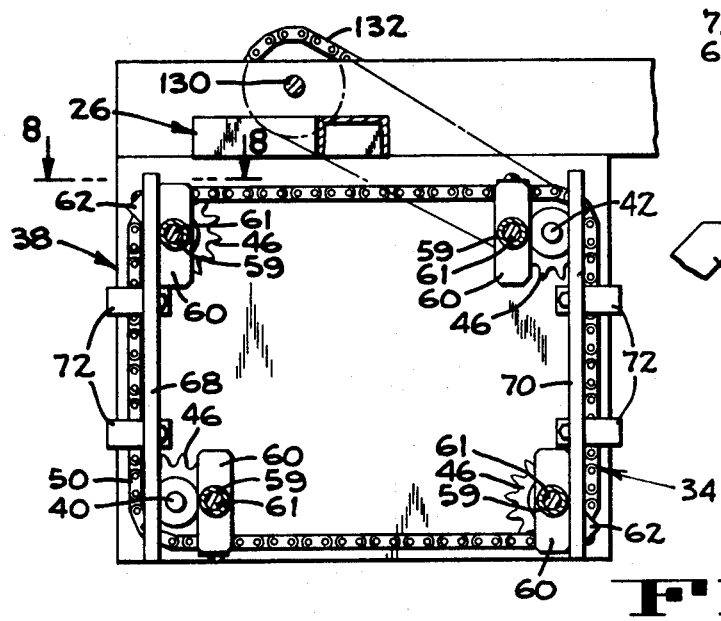

ROW CROP HARVESTER

BACKGROUND OF THE INVENTION

1. Field of the Invention

This invention pertains to the harvesting art and more particularly relates to a strawberry harvester which moves stripping fingers through the plants transversely outward of the rows but does not move the fingers longitudinally of the rows.

2. Description of the Prior Art

It is well known that strawberries when ripe and ready for harvest are relatively soft and may be easily damaged. It is also well known that the ripe strawberries are considerably larger and heavier than berries which have not yet ripened. Accordingly, these ripe berries tend to hang below the major portion of the foilage of their supporting plants.

A strawberry harvester is disclosed in United States Adrian U.S. Pat. No. 3,521,438. This harvester includes an endless flexible picker belt which extends longitudinally of the row being harvested. The picker belt includes spaced stripper fingers which project into the strawberry plants from both sides at ground level, and thereafter move along an upwardly inclined path causing the spaced fingers and strawberries to move from the bottom of the plants upwardly through all the foilage of the plants and in this way stripping the strawberries from the plants. The picker belt then continues moving the berries upwardly for subsequent collection.

SUMMARY OF THE INVENTION

The row crop harvester of the present invention is specifically designed to minimize injury to the strawberries, or other soft crops being harvested, by reducing to a minimum the distance of travel of the berries through the plant foilage. The harvester includes a mobile frame that is moved longitudinally along at least one but preferably two rows of strawberries planted on one ridge. The frame supports a pair of endless stripping conveyors that are centered relative to the rows on the ridge being harvested and have lower runs that are driven outwardly and rearwardly relative to the longitudinal axis of the harvester. Each conveyor carries a plurality of rows of stripper fingers that are mounted on carrier bars disposed parallel to the direction of movement of the harvester and are driven from the center of the ridge being harvested outwardly and rearwardly relative to the frame. The conveyors are driven in timed relation with the forward movement of the harvester by a drive mechanism which receives its power from one of the traction wheels of the vehicle. The timing is such that the rearward component of movement of the stripper fingers is at all times equal to the forward movement of the harvester resulting in that the stripper fingers move from the center of the ridge being harvested outwardly in a direction normal to the longitudinal axis of the ridge. The stripper fingers are also mounted individually on their carrier bars by parallelogram linkages thereby allowing the fingers to float over the ground and compensate for variations in contour of the ridge.

BRIEF DESCRIPTION OF THE DRAWINGS

FIG. 1 is a plan of the harvester of the present invention shown connected to a tractor.

FIG. 2 is a side elevation of the apparatus of FIG. 1, certain parts being broken away.

FIGS. 5 and 6 are vertical sections looking in the direction of lines 5—5 and lines 6—6 of FIG. 1, respectively, showing the mechanisms for supporting opposite ends of the conveyor carrier bars, said mechanism being arranged to move the carrier bars in a rectangular path.

FIG. 7 is an enlarged vertical section taken along lines 7—7 of FIG. 5 illustrating one end of one of the carrier bar mountings and the cam tracks at that end for controlling the movement of one of the conveyors.

FIG. 8 is an enlarged horizontal section taken along lines 8—8 of FIG. 6 illustrating the other end of one of the carrier bar mountings and the other cam tracks which control the movement of said conveyor.

DESCRIPTION OF THE PREFERRED EMBODIMENT

Figure 4:
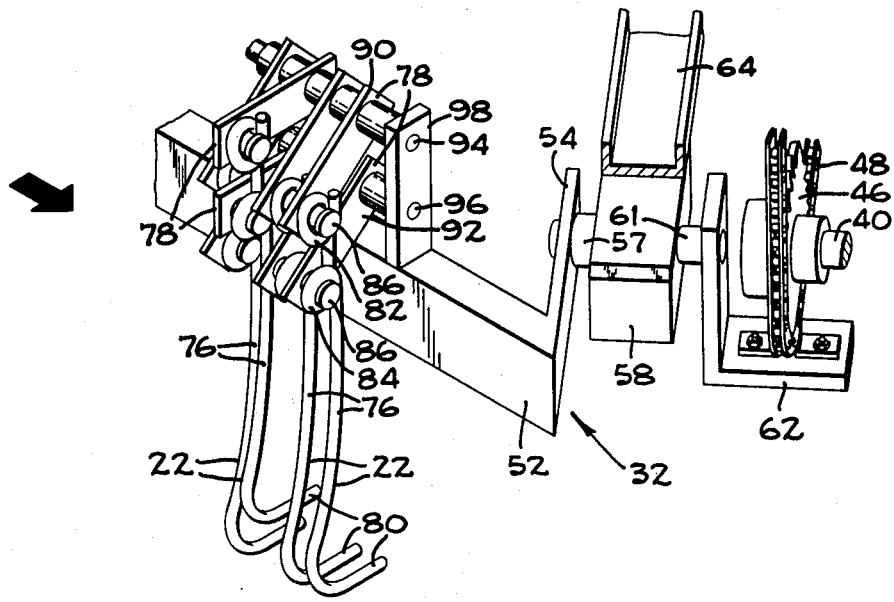
FIG. 4 is an enlarged perspective illustrating the structure for independently mounting the stripping fingers.

The row crop harvester 20 (FIGS. 1, 2 and 3) of the present invention is specifically designed to move stripper fingers 22 horizontally through strawberry plants P (FIG. 3) for gently stripping the strawberries S from their plants P and for moving them onto one of two collecting mechanisms 24 or 24a. Preferably, two rows of plants P are planted in each ridge R, and the fingers 22 are mounted for a limited amount of vertical movement for conforming to the contour of the ridge R. The fingers 22 enter the plants at approximately the longitudinal center of each ridge R (FIG. 3) and sweep outwardly in a direction normal to the ridge so as to minimize the distance through which the berries must travel thereby reducing the berry damage to a minimum.

As shown in FIGS. 1 and 2, the harvester 20 includes a frame 26 which is connected to a well known hydraulic lift assembly 28 of a tractor T enabling the forward end of the harvester to be raised and lowered between an elevated transporting position and a lowered harvesting position. A pair of caster wheels 30 (only one being shown) are journaled on the rear end of the frame 26 and are vertically adjusted by cranks 27 to support the rear end of the harvester at the desired level.

Two rearwardly angled stripper conveyors 32 and 34 (FIGS. 1 and 3) are supported by the frame 26 and are positioned on opposite sides of the longitudinal centerlines of the row being harvested. Since both conveyors are substantially mirror images of each other, only the conveyor 32 will be described in detail. The reference numerals used to designate parts of the conveyor 34 will be the same as those used to describe the conveyor 32 followed by the letter "a".

The conveyor 32 comprises a pair of spaced end plates 36 and 38 which are angled rearwardly and outwardly approximately 45 degrees from the longitudinal axis of the harvester. The plates 36 and 38 are rigidly secured to the frame 26. Each plate has three idler stub shafts 40, and a drive shaft 42, journaled thereon by bearings 43 (FIGS. 7 and 8). Sprockets 46 are keyed to each shaft, and have a forward endless chain 48 and a rear endless chain 50 trained therearound in generally rectangular patterns.

A plurality of carrier bars 52 (FIGS. 1 and 4) are disposed substantially parallel to the longitudinal axis of the harvester 20, and each bar has arms 54 and 56 welded thereto which are parallel to the end plates 36 and 38. The forward arm 54 (FIGS. 4 and 7) is rigid with a sleeve 57 and with an elongated block 58 (FIGS. 5 and 7), which block 58 has its long axis parallel to the longitudinal axis of the arm 54 and maintained at all times in a horizontal position. The rear arm 56 (FIGS. 1 and 8) is welded to a similar sleeve 59 and block 60 (FIGS. 6 and 8), and the block 60 has its longitudinal axis at 90 degrees to the longitudinal axis of the arm 56 and is maintained in a vertical position at all times. The arms 54 and 56 are pivotally connected to stub shaft 61 (FIG. 7) that are rigidly secured to generally L-shaped brackets 62 which are in turn secured to the associated chains 48 or 50.

In order to maintain the carrier bars 52 and the arms 54 and 56 horizontal at all times, horizontal extending cam tracks 63 and 64 (FIGS. 5 and 7) are secured to the forward end plate 36 by brackets 66 and cooperate with the blocks 58 when the associated carrier bars 52 are in either horizontal run of their travel to maintain the bars horizontal during said horizontal travel. Similarly, vertically extending cam tracks 68 and 70 (FIGS. 6 and 8) are secured to the rear plate 38 by brackets 72 and cooperate with the blocks 60 to maintain the carrier bars 52 horizontal when the bars are moving along either of their vertical runs. The stub shafts 61 are disposed in axial alignment with their associated chain supporting shafts 40 or 42 as illustrated in FIGS. 7 and 8 when the bars 52 are to change direction upon reaching a horizontal or vertical end of its stroke thus permitting the blocks 58 and 60 to guide the carrier bars 52 as above described. Thus, the bars 52 move in a rectangular path.

Each carrier bar 52 is arranged to support a plurality of stripper fingers 22 (FIG. 4) for independent floating movement so as to accommodate elevational variations in the soil. For this reason, and for the purpose of maintaining the shanks 76 of each finger substantially vertical at all times, a plurality of parallelogram linkages 78 are provided for individually supporting the fingers 22.

Figure 3:
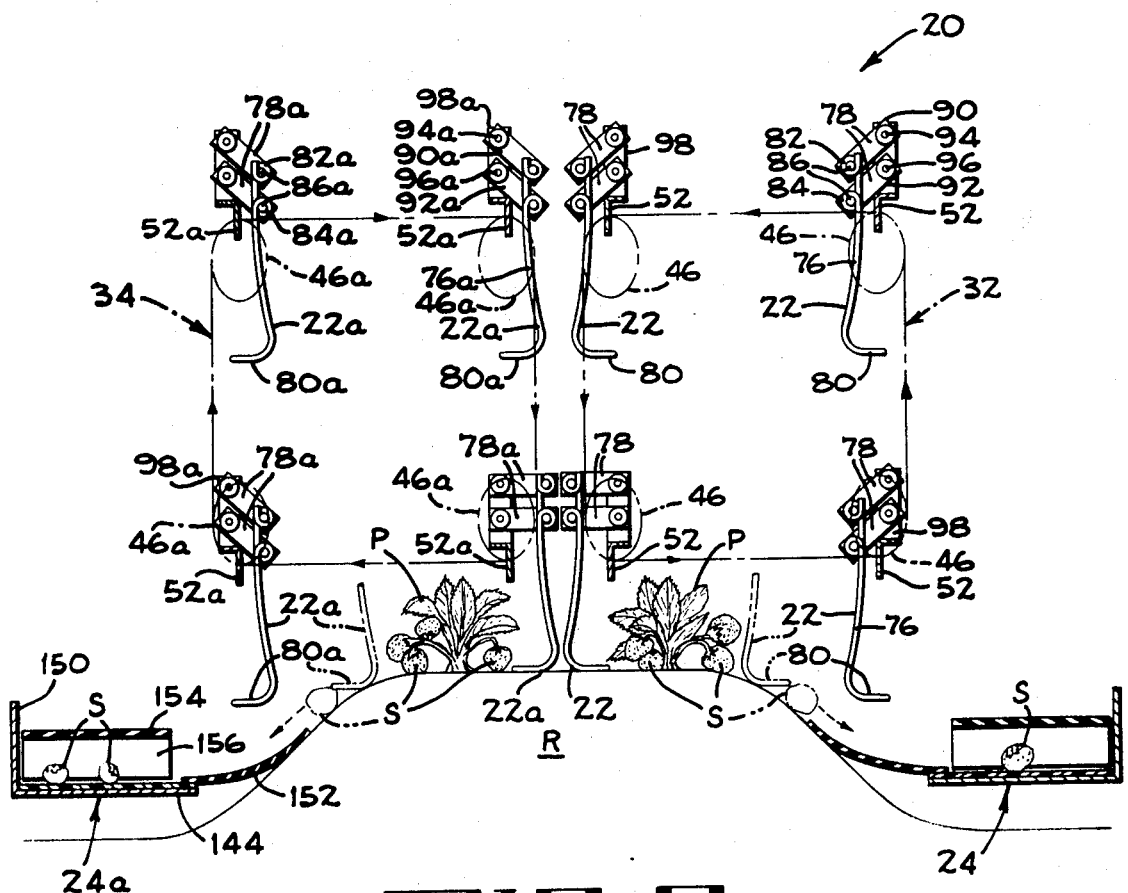
FIG. 3 is an enlarged diagrammatic vertical transverse section taken along lines 3—3 of FIG. 1 through a portion of the harvester showing the relationship between the stripper fingers and the planted two row ridge.

As illustrated in FIGS. 3 and 4, each finger includes a hooked lower end 80 that is integrally formed with the shank 76 which is constructed of spring steel and has two helical portions 82 and 84 formed near its upper end. The helical portions of the fingers are pivotally connected by shouldered capscrews 86 to links 90 and 92, respectively, of the associated parallelogram linkage 78. The other ends of the links 90 and 92 are pivotally connected to pivot rods 94 and 96, respectively, which are connected to the associated carrier bars 52 by upstanding spaced brackets 98. Thus, each parallelogram linkage 78 supports its associated finger 22 for free floating movement and also maintains the shank of the finger substantially vertical as indicated.

A drive train 100 (FIGS. 1 and 2) is provided for driving the stripper conveyors 32 and 34 in timed relation with the forward movement of the harvester 20 so that the rearward component of movement of the fingers 22 in the lower runs of the conveyor will be equal or substantially equal to the forward motion of the harvester. Thus, the stripper fingers 22 will have very little if any longitudinal movement relative to the ground, and accordingly will move transversely from the center of the ridge R (FIG. 3) outwardly in a direction substantially normal to the longitudinal axis of the ridge being harvested.

The drive train 100 (FIGS. 1 and 2) receives its power from a sprocket 102 connected to one wheel of the tractor T. The sprocket 102 is connected to a two piece idler shaft 104 connected by a clutch 104a and journaled on the frame 26 by a chain drive 106. The chain drive 106 is also trained around take-up rollers 108 and 110 journaled on a bar 112 that is pivoted to the frame 26 at 113 and is urged into chain tensioning engagement by a spring 114. Another chain drive 115 connects the idler shaft 104 to the input shaft 116 of a gear means 118. The output shaft 120 of the gear means 118 is coupled to an elongated shaft 122 which is connected by chain drives 124 and 126 to the drive shafts 42a of the stripper conveyor 34. The elongated shaft 122 is also coupled to a right angled gear means 128 which drives an elongated shaft 130. The shaft 130 is connected to the drive shafts 42 of the stripper conveyor 32 by chain drives 132 and 134. Thus, the drive train 100 drives the lower runs of the two stripper conveyors 32 and 34 transversely outwardly of the rows on the ridge R being harvested with little if any longitudinal movement relative to the ridge.

The collecting mechanism 24 and 24a are substantially the same and accordingly only the mechanism 24a associated with the stripper conveyor 34 will be described in detail.

The collecting mechanism 24a (FIGS. 1 and 2) is suspended from the frame 26 by vertically adjustable brackets 140 and 142 and an angle member 143. The mechanism 24a comprises a teflon coated collecting plate 144 having an upwardly angled forward portion 146 and an upwardly inclined rear portion 148 with an upstanding longitudinally extending outer side wall 150. A flap 152 (FIG. 3) of suitable resilient material such as belting is bolted to the inner edge of the plate 144 and serves to resiliently engage the adjacent side of the ridge R so as to cooperate with the ridge to define an uninterrupted sloping surface along which strawberries are moved by the fingers 22 so that they will all move onto the collecting plate 144. An endless belt conveyor 154 having flights 156 thereon is trained around a plurality of rollers 158 journaled on the side wall 150 and driven in the direction indicated by the arrows in FIGS. 1 and 2 by any suitable drive means such as a hydraulic motor 160 (FIG. 1) that receives its power from the hydraulic system of the tractor T and which is connected to the drive shaft 161 of the conveyor 154.

The conveyor 154 discharges the strawberries onto an elevator 168 which is trained around rollers 170 journaled on the frame 26. The elevator 168 is provided with flights 171 and is driven by a chain drive 174 from the shafts 161 in the direction of the arrows to discharge strawberries into crates 176 or similar containers.

In operation, the rear end of the harvester 20 is adjusted to the desired elevation for the particular field being harvested by means of the caster wheel adjustment mechanisms that are operated by the handles 27 (FIG. 2). The tractor T and harvester 20 are then aligned with and are driven along the ridge R (FIG. 3) to be harvested. Upon reaching the strawberry plants P, the operator lowers the front end of the harvester by means of the hydraulic lift 28 (FIG. 2). The drive system 100 for the stripper conveyors 32 and 34 is arranged to drive the conveyors at speeds which will cause the fingers 22 to move rearwardly relative to the frame 26 at a speed substantially equal to the forward speed of the tractor T. Thus, the fingers 22 of each conveyor move outwardly from the longitudinal axis of the ridge being harvested in a direction normal to the ridge. Since the drive system 100 is coupled to a ground engaging wheel, the conveyors 32 and 34 are driven in direct relation to the ground speed, and the fingers will move outwardly normal to the longitudinal axis of the ridge at any of these forward speeds.

As illustrated in FIG. 3, the resilient fingers 22 of each conveyor 32 or 34 enter the rows being harvested at the longitudinal midpoint of the ridge R and move outwardly through the plant foilage thereby stripping the large ripe strawberries from the plants. Since these ripe strawberries lie below the major portion of the plant foilage, damage to the berries due to the transverse movement of the berries is minimal. During this stripping action, the parallelogram linkages 78 which individually mount the fingers 22 allow the fingers to follow the contour of the ridge R. It will be understood that the spacing between fingers 22 is sufficient to allow the fingers to move past small strawberries that have not ripened without dislodging the berries from the plants. The ripe strawberries are moved onto the resilient flaps 152 and then into the associated collecting mechanisms 24 or 24a (FIGS. 1 and 2). The conveyor 154 and elevators 168 are driven by the hydraulic motors 160 to convey the berries to collecting means such as the crates 176.

Although the drawings illustrate two rows of strawberry plants P on each ridge R, it will be understood that if only one row of plants is present on each ridge, that the fingers 22 and 22a will enter the midpoint of that row and move outwardly in opposite directions through their half of the row of plants to strip the berries therefrom.

From the foregoing description it is apparent that the row crop harvester of the present invention utilizes a pair of stripper conveyors which include lower runs that are spaced on opposite sides of the longitudinal axis of the ridge being harvested and which lower runs move outwardly and rearwardly relative to the harvester at speeds which cause the rearward movement of the stripper fingers carried by the conveyor to equal the forward speed of the harvester with the result that the fingers move normally to the longitudinal axis of the ridge being harvested. The stripper conveyors also move the fingers along rectangular paths, and each finger is mounted independently upon a parallelogram linkage so as to follow the contour of the ridge while stripping berries from the plants.

Although the best mode contemplated for carrying out the present invention has been herein shown and described, it will be apparent that modification and variation may be made without departing from what is regarded to be the subject matter of the invention.

What I claim is:

1. An apparatus for removing articles from plants on a ridge comprising: a mobile frame having a longitudinal axis; power means connected to said frame for moving said frame forwardly and longitudinally of the ridge; an endless conveyor on said frame having a downwardly moving run disposed parallel to the direction of movement of the mobile frame and the ridge and a lower run moving rearwardly and outwardly relative to said mobile frame; said conveyor including a pair of spaced parallel endless chains, a plurality of generally horizontal rows of stripper fingers, carrier means connected to and extending between said chains for mounting said plurality of rows of stripper fingers on said chains with the rows of fingers disposed substantially parallel to the direction of movement of said frame; and means connected between said power means and said conveyor for driving said conveyor in timed relation with the forward movement of said mobile frame and at a speed which causes the rearward component of movement to substantially equal the forward movement of said frame for causing the stripper fingers when in said lower run to move through at least a portion of the plants in a direction normal to the direction of movement of the frame for removing articles from the plant.

2. An apparatus according to claim 1 and additionally including means on said frame for collecting said articles.

3. An apparatus according to claim 1 and additionally comprising means for individually mounting each finger on its carrier means for limited vertical movement of the entire finger relative to said carrier means whereby each finger will gently follow the contour of the ridge when moving along a substantial portion of said lower run.

4. An apparatus according to claim 1 wherein said apparatus is a strawberry harvester and wherein said fingers in each row are spaced a sufficient distance apart to allow small unripe strawberries to pass therebetween when the fingers are moving through the plants and are dislodging the larger ripe strawberries therefrom.

5. An apparatus for removing articles such as strawberries from plants on a ridge comprising: a mobile frame having a longitudinal axis; power means connected to said frame for moving said frame forwardly and longitudinally of said ridge; a pair of endless stripping conveyors on said frame with one conveyor disposed on one side of the longitudinal axis of said frame and with the other conveyor disposed on the other side of said longitudinal axis; each of said conveyors having a lower run moving rearwardly and outwardly from said longitudinal axis, each of said conveyors including a pair of spaced parallel endless chains, a plurality of generally horizontal rows of stripper fingers for each conveyor, carrier means connected to and extending between associated ones of said chains for mounting said plurality of rows of stripper fingers on said associated chains with the rows disposed substantially horizontal and parallel to said longitudinal axis; and means connected between said power means and said conveyors for driving each of said conveyors in timed relation with the forward movement of the frame and at a speed which causes the rearward component of movement of each finger to substantially equal the forward movement of said frame for causing the stripper fingers when in said lower run to move outwardly from substantially the center of said ridge in directions normal to the direction of movement of the frame to remove articles from the plants.

6. An apparatus according to claim 5 and additionally including guide means for causing the carrier means of each conveyor to move in a rectangular path.

7. An apparatus according to claim 5 and additionally including means adjacent the outer ends of the lower runs of each conveyor for collecting the stripped articles.

8. An apparatus according to claim 5 and additionally comprising means for individually mounting each finger to its carrier means for limited vertical movement of the entire finger relative thereto whereby each finger will gently follow the contour of the ground when moving along at least a substantial portion of said lower run.

9. An apparatus according to claim 7 wherein said fingers in each row are spaced a sufficient distance apart to allow small unripe strawberries to pass therebetween when the fingers are moving through the plants in said lower run and are dislodging the larger ripe strawberries therefrom.

10. An apparatus according to claim 1 and additionally including guide means for causing the carrier means of said conveyor to move in a rectangular path, said guide means including guide blocks rigidly secured to said carrier means, and track means secured to said frame and positioned to slidably engage said guide blocks.

11. An apparatus according to claim 5 and additionally including guide means for causing the carrier means of each conveyor to move in a rectangular path, said guide means including guide blocks rigidly secured to said carrier means, and track means secured to said frame and positioned to slidably engage said guide blocks.

* * * * *